United States Patent
Kim et al.

(10) Patent No.: US 9,681,003 B1
(45) Date of Patent: Jun. 13, 2017

(54) METHOD AND SYSTEM FOR MANAGING DEVICE STATUS AND ACTIVITY HISTORY USING BIG DATA STORAGE

(71) Applicant: Aeris Communications, Inc., Santa Clara, CA (US)

(72) Inventors: Hyungho Kim, Cupertino, CA (US); Dae Seong Kim, Campbell, CA (US)

(73) Assignee: Aeris Communications, Inc., Santa Clara, CA (US)

( * ) Notice: Subject to any disclaimer, the term of this patent is extended or adjusted under 35 U.S.C. 154(b) by 174 days.

(21) Appl. No.: 14/213,593

(22) Filed: Mar. 14, 2014

Related U.S. Application Data

(60) Provisional application No. 61/785,039, filed on Mar. 14, 2013.

(51) Int. Cl.
*H04W 4/24* (2009.01)
*H04M 15/00* (2006.01)

(52) U.S. Cl.
CPC ............ *H04M 15/66* (2013.01); *H04W 4/24* (2013.01)

(58) Field of Classification Search
CPC ......... H04W 4/24; H04W 4/26; H04M 15/58; H04L 41/22
USPC ........................................................ 455/406
See application file for complete search history.

(56) References Cited

U.S. PATENT DOCUMENTS

| | | | | |
|---|---|---|---|---|
| 5,463,381 A * | 10/1995 | Ryu | .................. | G06F 17/30339 |
| 6,826,598 B1 * | 11/2004 | Titmuss | ............... | G08G 1/0962 709/212 |
| 7,925,740 B2 * | 4/2011 | Nath | ...................... | H04W 24/08 455/404.2 |
| 8,572,290 B1 * | 10/2013 | Mukhopadhyay | | G06F 17/30094 709/251 |
| 8,938,416 B1 * | 1/2015 | Cole | .................. | G06F 17/30592 707/607 |
| 2008/0003996 A1 * | 1/2008 | Strandell | ............. | H04L 12/5895 455/420 |
| 2011/0085654 A1 * | 4/2011 | Jana | ..................... | H04L 12/5815 379/220.01 |
| 2013/0031229 A1 * | 1/2013 | Shiga | .................. | G06F 17/3033 709/223 |
| 2013/0110961 A1 * | 5/2013 | Jadhav | .................. | G06F 15/167 709/213 |
| 2013/0196617 A1 * | 8/2013 | Zalmanovitch | ....... | H04W 24/02 455/405 |

(Continued)

*Primary Examiner* — Nathan Taylor

(74) *Attorney, Agent, or Firm* — Brundidge & Stanger, P.C.

(57) ABSTRACT

In one or more embodiments, a computer-implemented method and system to receive, store and process status and activity information of subscriber devices connected to a network is disclosed. The method and system comprise delivering information relating to the status or activity of at least one device to one or more of the services used by the network operator for subscription and device management (such as a home subscriber server or HSS, gateway or policy and charging rules function or PCRF) and extracting all or at least a portion of the information received by the HSS, gateway or PCRF. The system and method further includes storing the status and activity information for the at least one device received by the at least one subscription and device management service into one or more distributed database nodes.

11 Claims, 6 Drawing Sheets

Example of Distributed Database Node

(56) References Cited

U.S. PATENT DOCUMENTS

| | | | | |
|---|---|---|---|---|
| 2013/0238366 A1* | 9/2013 | Morgan | ................ | B60R 25/04 |
| | | | | 705/4 |
| 2014/0074774 A1* | 3/2014 | Ito | ................ | G06F 17/30584 |
| | | | | 707/609 |
| 2014/0172898 A1* | 6/2014 | Aguilera | ........... | G06F 17/30575 |
| | | | | 707/759 |
| 2014/0203948 A1* | 7/2014 | Raskar | ................ | H04L 1/00 |
| | | | | 340/870.02 |
| 2014/0208439 A1* | 7/2014 | Sasaki | ................ | G06F 21/00 |
| | | | | 726/28 |
| 2014/0222873 A1* | 8/2014 | Nakadai | ........... | G06F 17/30339 |
| | | | | 707/803 |
| 2014/0244794 A1* | 8/2014 | Nakadai | ................ | H04L 67/104 |
| | | | | 709/217 |

* cited by examiner

Example of Non-Relational Distributed Database Structure

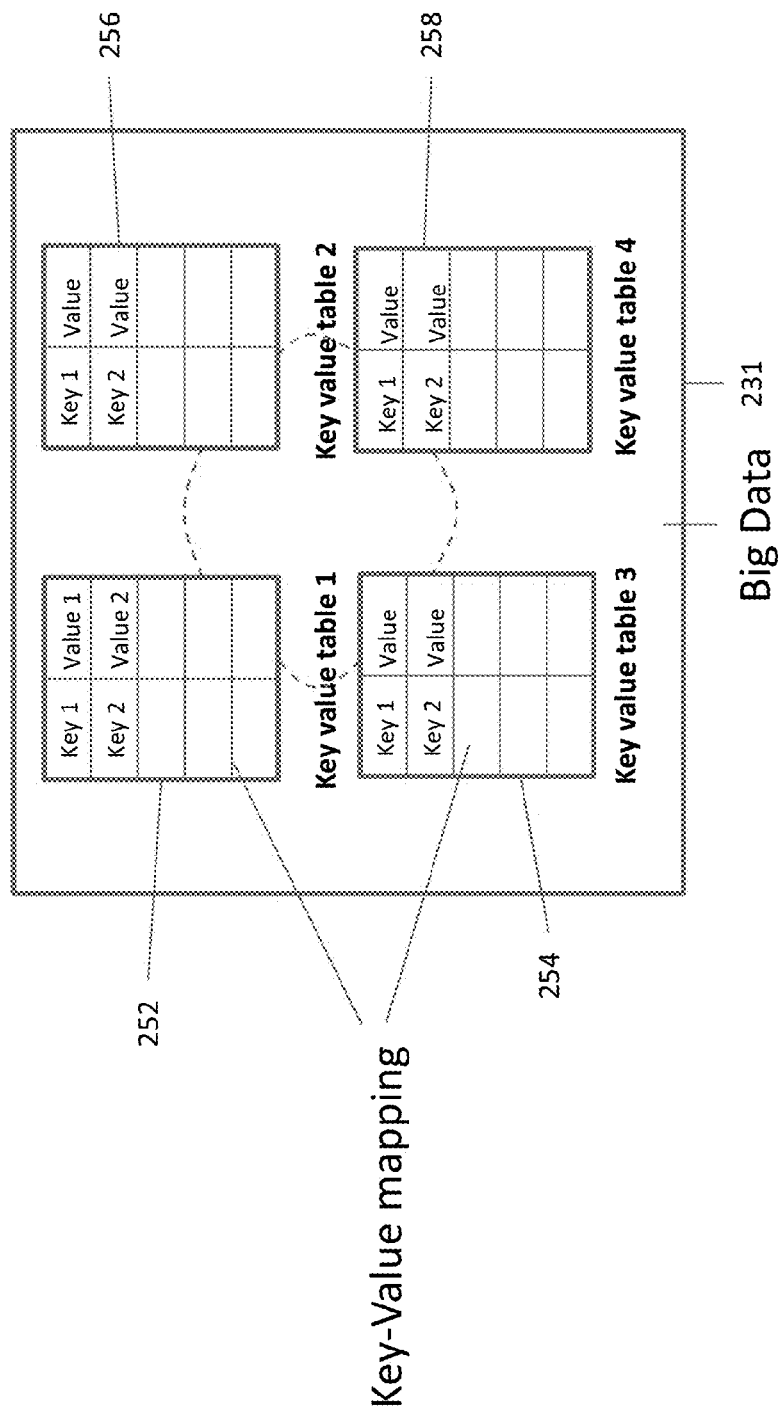

METHOD AND SYSTEM FOR MANAGING DEVICE STATUS AND ACTIVITY HISTORY USING BIG DATA STORAGE

CROSS-REFERENCE TO RELATED APPLICATIONS

Under 35 USC 119(e), this application claims priority to U.S. provisional application Ser. No. 61/785,039, filed on Mar. 14, 2013.

FIELD OF THE INVENTION

The present invention relates generally to using distributed databases for receiving and storing data relating to status of and activity of devices connected to a network and more particularly to managing information relating to the status of or activity of devices using a distributed database.

BACKGROUND

Many people all over the world carry multiple devices such as cell phones, laptops or tablets which communicate with many other devices through wireless communication networks. In addition, the number of devices or machines enabled for connectivity to cellular or other wireless network services for machine-to-machine applications, such as telematics devices in automobiles or devices enabled for monitoring and reporting on such things as patient health or utilities, or used for tracking assets, is growing exponentially. The cellular technologies and core network elements that are in use today were originally designed for handling human voice traffic from a number of devices that correlated more closely with the actual number of individual subscribers, straining the ability of network management entities, such as services that receive location information and authenticate devices connecting to a network (for example, home subscriber servers or HSS), that control device activity (referred to as policy and charging rules functions, or PCRF), or that process device activity (often referred to as a gateway), as well as core network switches and databases that store subscriber profiles and activity data not only to handle actual device traffic but also to receive, store and use the exploding quantities of status and activity data generated by those devices.

This fundamental shift in numbers of connected devices has very significant implications for being able effectively to manage data relating to these devices. In addition, as the number of data points to be managed, such as subscriber activity information, subscriber device location change, etc., also increases, requirements for data management systems to be used by network operators in operating networks and providing desirable services to subscribers have increased tremendously as well, in terms of capacity for handling data volume, complexity of the data and the sheer number of associated transactions.

However, the cellular technology still in use is optimized for handling voice data or ordinary "texting", or short messages (SMS), activities, from human subscribers with a single device, not the load on networks in terms of numbers of connected devices and numbers of transactions per device caused by the multiplication of devices owned by individual consumers or for the data-intensive activities of these consumer devices. Furthermore cellular technology is not optimized for the explosion in the number of devices used in machine-to-machine communications. These new demands can exceed the ability of networks that are designed to meet the needs of a limited number of consumer devices, and that operate with back end systems using current versions of relational databases, to efficiently manage the large amounts of data or numbers of transactions.

Accordingly, what is desired is a method and system that overcomes the above-identified issues. The present invention addresses this need.

SUMMARY

In one or more embodiments, a computer-implemented method and system to receive, store and process status and activity information of subscriber devices connected to a network is disclosed. The method and system comprises delivering status and activity information of at least one device to a network management entity; and extracting at least a portion of the status and activity information by the network management entity. The method and system further includes delivering the at least a portion of the status and activity information extracted for the at least one device into one or more nodes of a distributed database.

Advantages of using distributed databases originate mainly from their ability to handle unstructured, or non-relational, data, and the database operator's ability to scale such databases quickly and less expensively using widely-available hardware and software, allowing for high availability and increased flexibility. Network operators deploying big data capabilities can then offer additional services to subscribers or others, such as proactive network monitoring to ensure "always on" connectivity or services based on analysis of stored data, by accumulating and tracking data relating to the status of devices or device-initiated events and other parameters, such as location information, message activity, etc.

BRIEF DESCRIPTION OF THE DRAWINGS

FIG. 2c illustrates basic structure of a non-relational distributed database in accordance with an embodiment of the present invention.

DETAILED DESCRIPTION

The present invention relates generally to using distributed databases for receiving and storing data relating to status of and activity of devices connected to a network and more particularly to managing information relating to the status of or activity of devices using a distributed database. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Network operators use several types of management entities for managing the status and activity of subscriptions and devices on the network. The management entity for receiving device location information and authenticating devices connecting to a network is hereinafter referred to as a Home Subscriber Server or HSS. Most network operators also use services to process, using a gateway, and to control and manage, using policy and charging rules functions, or PCRF, the activity of authenticated devices. These services support the ability of network entities to handle calls/sessions by user devices in accordance with the requirements of the specific network technology, such as third generation cellular service (3G) technical specification 23.002 (3GPP TS 23.002)) and in accordance with usage rules set by the subscriber or the network operator. The HSS, gateway and PCRF historically have been configured to receive and store data relating to the activity of devices principally for use for billing purposes. Network operators may want to keep track of historical data relating to status and activity of devices for other reasons, such as subscriber demand for greater information about the subscriber's devices, or to offer additional value-added services, such as monitoring devices and providing proactive alerts to the subscriber when certain parameter thresholds are exceeded. However, receiving, storing and using this data is increasingly challenging due to the exponential increase in the amount of data generated by the numbers of and activities of connected devices.

Figure 1A:
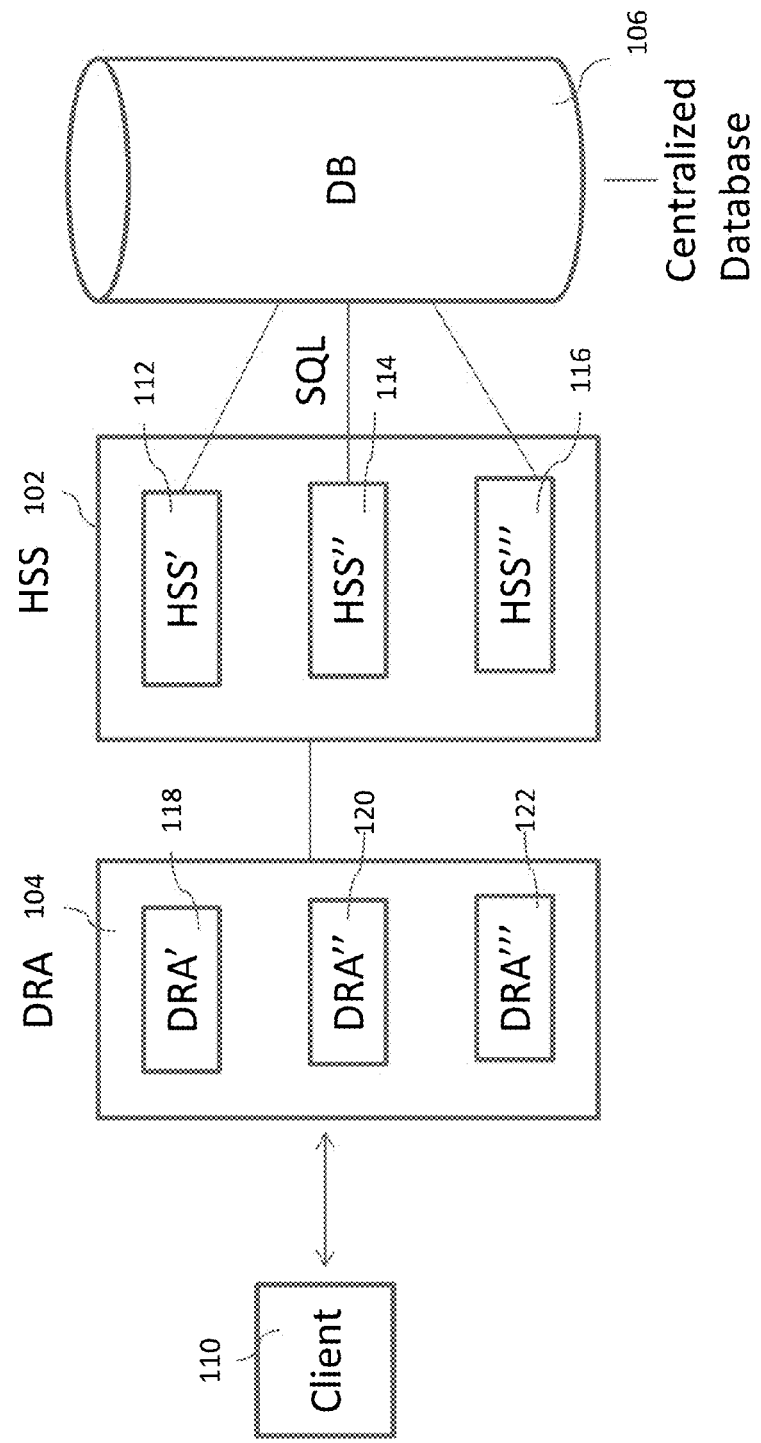
FIG. 1a illustrates a block diagram of a basic network for data management using a typical relational database.

FIG. 1a illustrates a block diagram of a basic network for management of data relating to HSS activity using a traditional relational database. In FIG. 1a a home subscriber server (HSS) system 102 comprises several home subscriber server nodes (HSS) 112, 114 and 116 connected to a centralized relational database (DB) 106. HSS system 102 interacts with the DB 106, which stores the data, via structure query language (SQL). The HSS system 102 interacts with other networks such as a client 110 via an agent such as a diameter relay agent (DRA) 104 or a service locator function (SLF) 108. The interaction allows the HSS system 102 to receive activity information from devices connected to the client 110.

Figure 1B:
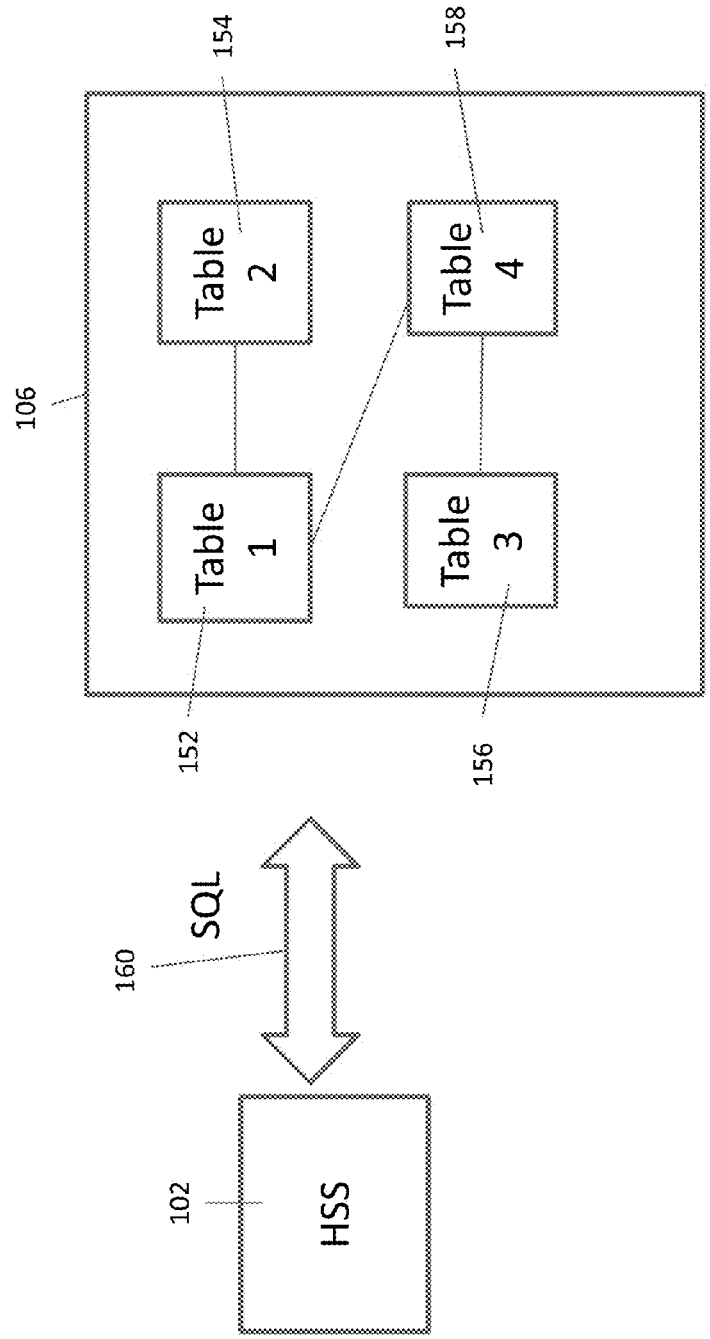
FIG. 1b illustrates basic structure of a typical relational database.

FIG. 1b illustrates a basic structure of the DB 106 for handling data from a HSS. The DB 106 is operated on centrally-managed equipment and is based upon a relational structure among different data tables. The typical relational database operates using software tools that exploit the structure, for example structured query language (SQL). The DB 106 comprises a plurality of data tables depicted as Table 152, Table 154, Table 156 and Table 158. As illustrated, each of the tables 152-158 has a direct connection to another table. In the typical network, the HSS receives data from devices and sends it to designated tables in the database, or queries the database for data required for network operation. The DB 106 interacts with HSS 102 using for example structured query language (SQL) via channel 160.

To allow relational databases to handle a large amount of data, such as that produced in a cellular network environment with increasingly large numbers of devices, a technique referred to as sharding is used. Sharding is a type of database partitioning that separates very large databases into smaller, faster, more easily managed parts called data shards, effectively splitting a database into data containers, or buckets, to improve speed and reliability of the application. For a database user (whether network operator or subscriber) to access the data deposited in the buckets, the database user must know the exact location of the data within the relational database structure and has to employ an additional function such as a service locator function (SLF) to locate the data. Therefore, as the number of buckets increase with an increase in the amount of data, the database user will have to actively make changes in the applications that access the data. The possibility of errors in retrieving data stored in the relational database grows even greater.

Therefore, a system and method is required to solve the problem faced by network operators in handling the large and growing amounts of data generated by the activity of devices connected to a network. The present system and method in accordance with an embodiment allows the efficient processing, storage and retrieval of data using a distributed database instead of a typical relational database.

When additional capacity is required in a distributed database, nodes can be added to a pre-existing cluster of distributed data nodes, and data can be directed to the newly-added nodes using a technique similar to the sharding technique used in some relational databases, greatly increasing the database user's ability to quickly scale capacity. Sharding as implemented in a typical relational database requires adjustment of applications to enable them to locate data that has been placed in new data containers, or buckets. As implemented in a distributed database, however, no changes to applications are required when adding nodes; the architecture of the database and software allow data to be retrieved without the need to change the definition of the available nodes in the database. The process of adding these database nodes is transparent to the database user.

Common distributed database systems enable the location of specific data through the use of key value tables. The application sending data to a database node interfaces with a database feature that assigns a unique key value to that data identifying the node where the data is being stored, and gives the key value both to the application and to the key value store used by all of the nodes in the database. When the application later wants to retrieve the data, it furnishes the key value to the database, and the key value store available to all of the nodes in the database looks up the key and sends the request to the appropriate node, which then locates the data and returns it. The application does not need to know anything other than the key value in order to retrieve the data. The key value store is logically but not physically coupled to the nodes of the database.

To describe the features of the present invention in more detail refer now to the following discussion in conjunction with the accompanying figures.

Figure 2A:
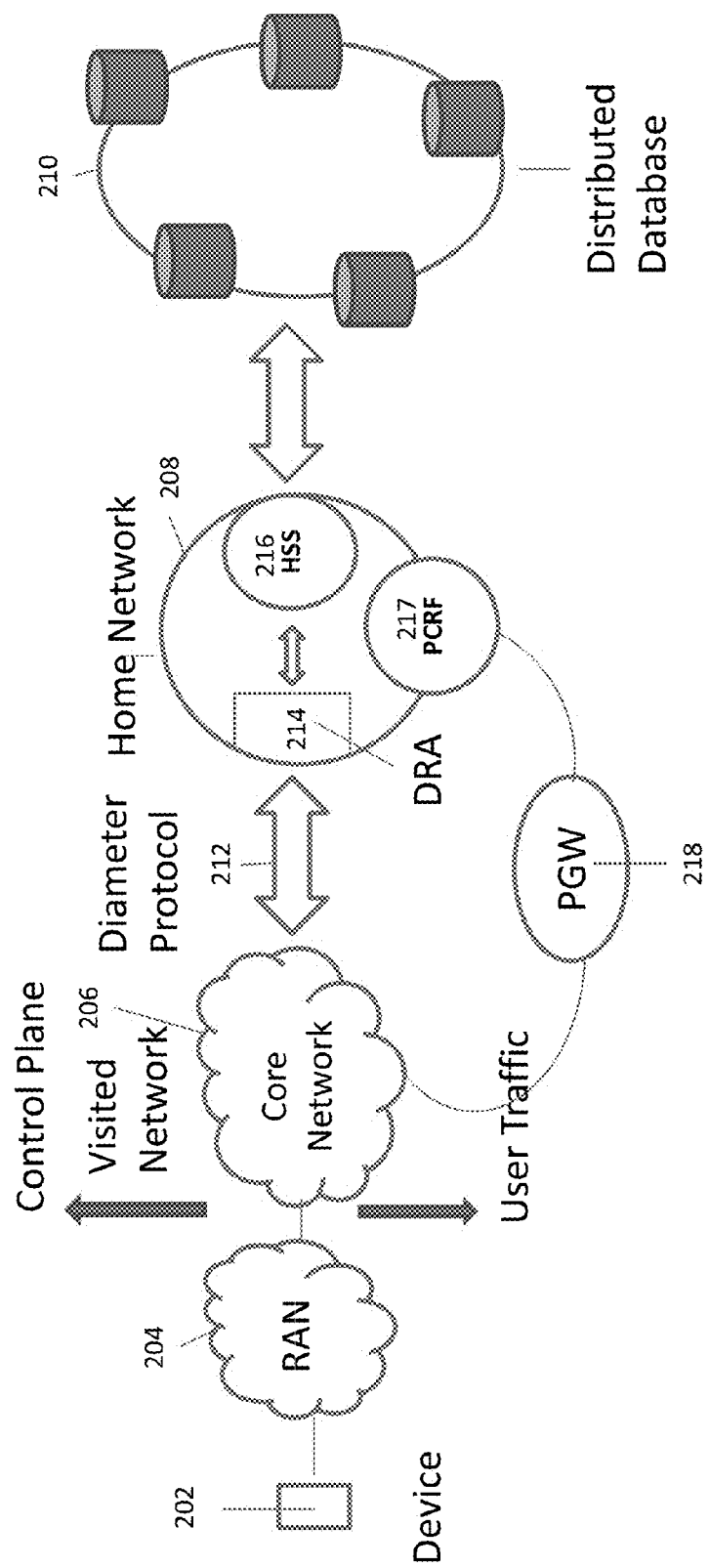
FIG. 2a illustrates a block diagram of a cellular network which uses a non-relational distributed database in accordance with an embodiment of the present invention.

FIG. 2a illustrates a block diagram of a network for management of data relating to devices using a non-relational distributed database in accordance with an embodiment of the present invention. The network could be any type of network in which data relating to the activity of devices connected to the network is handled by a user- or subscriber-management system and stored, such as cellular networks handling machine-to-machine traffic. As illustrated in FIG. 2a, a device 202 communicates via a radio access network (RAN) 204 with a network 206 of which the device is not a subscriber. The visited network 206 further communicates with the network on which the device has a subscription (the "home" network) 208 according to standard inter-network communication protocol 212. User traffic between the visited network 206 and home network 208 is handled through a gateway according to network protocol, such as a packet data network gateway (PGW) 218. The home network 208 comprises an agent for relaying communications to and from visited networks (DRA) 214, the PCRF 217, and a HSS 216. The HSS and PCRF for the home network store and retrieve data, including subscriber data and device activity data, using a distributed (non-relational) database 210 having one or more database nodes 231a-231e.

Figure 2B:
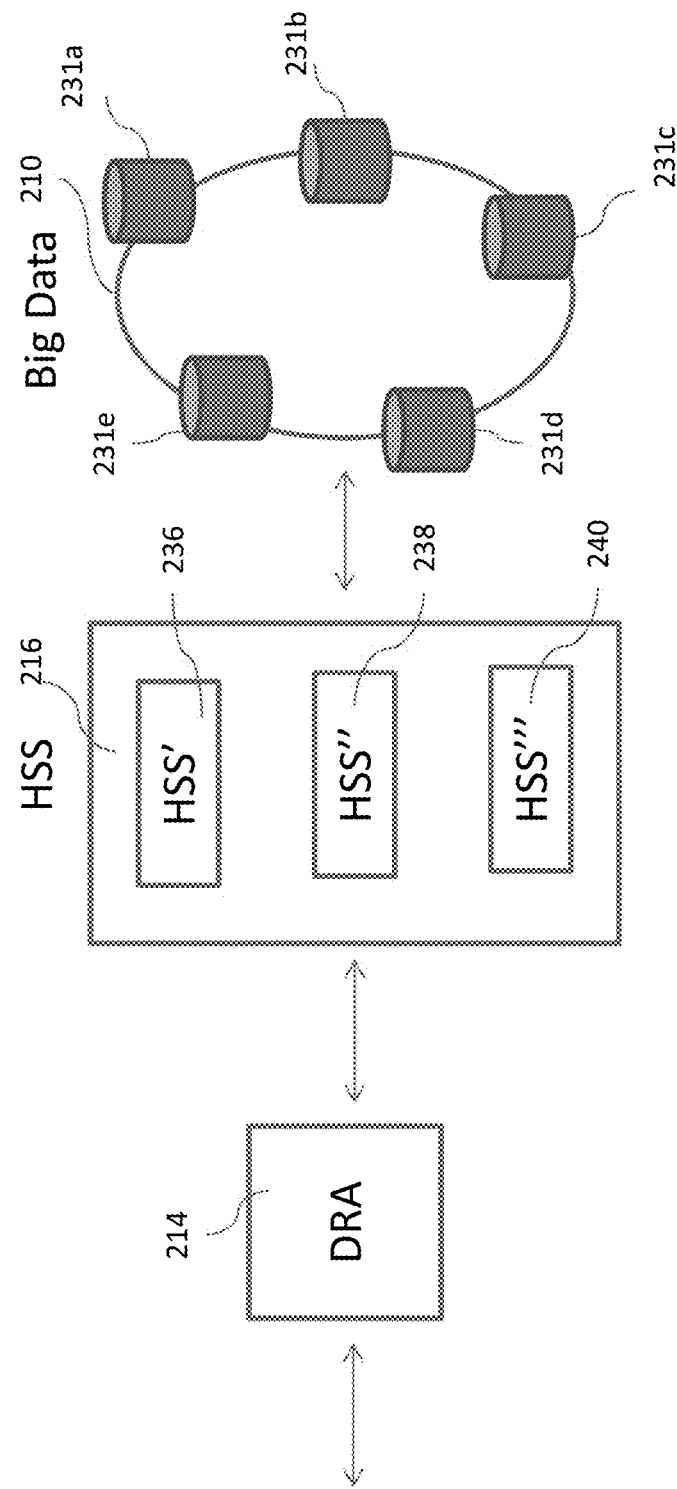
FIG. 2b illustrates a basic cellular network using a non-relational distributed database in accordance with an embodiment of the present invention.

FIG. 2b illustrates a block diagram of a basic network for management of data relating to HSS activity using a distributed database, where a HSS system 216, in this case comprised of a plurality of system nodes depicted as 236, 238 and 240, connected to a cluster of distributed database nodes 231a-231e. The HSS nodes 236-240 are in communication with the cluster of distributed database nodes 231a-231e. The HSS system 230 can interact with other networks, such as visited networks, via the relay agent (DRA) 214 to receive information relating to devices connected to the visited networks.

FIG. 2c illustrates basic structure of a distributed database node 231 in accordance with an embodiment of the present invention. In an embodiment, applications access data within the database node 231 utilizing logic that associates keys to values, keys to keys etc. As shown in FIG. 2c, database node 231 includes a plurality of key-value tables 252-258. Each key value table 252-258 further includes key-value mapping wherein keys are mapped to values i.e. key 1—value 1, key 2—value 2 . . . key n—value n etc. within each of the key tables 252-258.

To access a typical relational database, the database user must be using a machine that is in actual communication with the computers holding the relational database. As the number of users trying to connect to the relational database increases, or as the number of pieces of data searched for by each user increases, bottlenecks can occur and performance can deteriorate. A distributed database, unlike the typical relational database, is not controlled by a centralized system of machines holding the database management system. The data sought can be located in any number of different database nodes, which may be located not only on different computers but in different geographic locations. Since database users do not need to connect to a centralized set of computers, and since the key value tables enabling retrieval of data are linked logically, but not physically, to the database nodes, the performance at worksites of database users is often improved as transactions are processed across many machines hosting many nodes, instead of being limited to one large relational database.

Using distributed databases will allow authorized users to access the databases to offer value-added services to subscribers or others that would be difficult to provide given current database capacity and performance limitations. Distributed databases allow the accumulation, storage and retrieval of large amounts of data generated by, or obtained through tracking of, large numbers of devices connected to the network, such as time and location information, types of activity, numbers of sessions and quantity or size of data or other messages passed, and the like. These services could be particularly valuable to subscribers that deploy many devices on the network, such as customers in the machine-to-machine market. Described below are some of the examples of different applications based on big data storage using a distributed database enabled by the present invention.

In an embodiment, the computer-implemented method enables the receipt, storage and analysis of information relating to the status of a subscriber's connected devices and the activity history for such devices; by continuously receiving the information in the distributed database using the method and processing the stored data, the network operator may be able to detect patterns or situations where predetermined status or activity thresholds have been exceeded, thus allowing the network operator to provide proactive network alerts to subscribers. For example, subscribers who require devices to be "always on" may value receiving alerts that certain devices have not engaged in expected activity and appear not to be on.

In another embodiment, the computer-implemented method described above allows the network operator to receive, store and process device status and activity information relating to device location and to offer location-based services to subscribers such as geo-fencing.

In yet another embodiment, the computer-implemented method described above allows the network operator to receive, store and process device status and activity information relating to the numbers and types of activity sessions and the signal strength and success in passing traffic to enable services, either for subscribers or for internal purposes, for monitoring variable quality of service (QoS).

In one more embodiment, the computer-implemented method described above allows the network operator to analyze device status and activity information for purposes of detecting abnormal usage patterns and issuing fraudulent usage warnings to subscribers.

Figure 3:
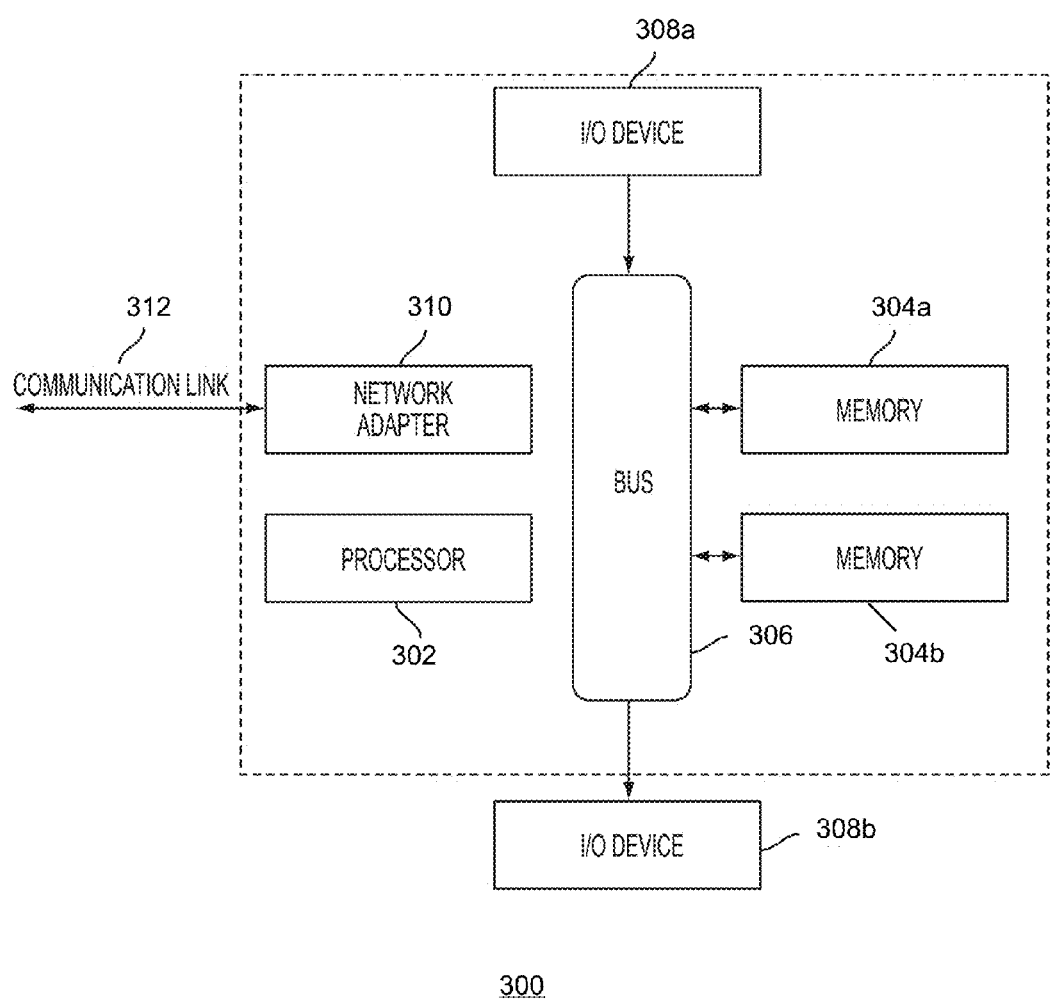
FIG. 3 illustrates a data processing system suitable for storing the computer program product and/or executing program code in accordance with an embodiment of the present invention.

FIG. 3 illustrates a data processing system 300 suitable for storing the computer program product and/or executing program code in accordance with an embodiment of the present invention. The data processing system 300 includes a processor 302 coupled to memory elements 304a-b through a system bus 306. In other embodiments, the data processing system 300 may include more than one processor and each processor may be coupled directly or indirectly to one or more memory elements through a system bus.

Memory elements 304a-b can include local memory employed during actual execution of the program code, bulk storage, and cache memories that provide temporary storage of at least some program code in order to reduce the number of times the code must be retrieved from bulk storage during execution. As shown, input/output or I/O devices 308a-b (including, but not limited to, keyboards, displays, pointing devices, etc.) are coupled to the data processing system 300. I/O devices 308a-b may be coupled to the data processing system 300 directly or indirectly through intervening I/O controllers (not shown).

In FIG. 3, a network adapter 310 is coupled to the data processing system 302 to enable data processing system 302 to become coupled to other data processing systems or remote printers or storage devices through communication link 312. Communication link 312 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present disclosure in more detail refer now to the following description in conjunction with the accompanying Figures.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

Similarly, it is envisioned by the present invention that the term communications network includes communications across a network (such as that of a network for machine-to-machine or M2M communications but not limited thereto) using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WILAN), and one or more wired networks.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

Accordingly, many modifications may be made by one of ordinary skill in the art without departing from the spirit and scope of the present invention.

What is claimed is:

1. A computer-implemented method for managing status and activity history of a device comprising:
   delivering status and activity information of at least one device to a network management entity;
   extracting at least a portion of the status and activity information by the network management entity, and
   delivering the at least a portion of the status and activity information extracted for the at least one device into one or more nodes of a distributed database;
   wherein an application sending data to the one or more nodes of a distributed database interfaces with a database feature that assigns a unique key value to that data identifying a node where the data is being stored;
   wherein the status and activity information comprises any of whether the device is on or off, location of the device, numbers and types of activity sessions and signal strength and success in passing traffic and a combination thereof, and
   each of the one or more database nodes includes access to one or more key value tables to allow for access to at least a portion of the status and activity information.

2. The computer-implemented method of claim 1, wherein the network management entity comprises any of a network subscriber and a device management service.

3. The computer-implemented method of claim 2, wherein the device management service includes at least one of a home subscriber server (HSS), a gateway and a policy and charging rules function (PCRF) service.

4. The computer-implemented method of claim 1, wherein the distributed database comprises at least two nodes and at least one node has a different geographic location from another node.

5. The computer-implemented method of claim 1, wherein the key value tables have no physical relationship to each other.

6. The computer-implemented method of claim 1 further comprising processing of the at least a portion of the status and activity information to determine the usage patterns of the device for processing of billing and rate rules and options applicable to an account of a subscriber.

7. The computer-implemented method of claim 1 further comprising processing of the at least a portion of the status and activity information regarding the location of and activity pattern for a device for purposes of performing analysis of the data with minimum time delay.

8. The computer-implemented method of claim 1 further comprising processing of at least a portion of the status and activity information regarding network activity pattern of the device for enabling monitoring device connectivity.

9. The computer-implemented method of claim 1 further comprising processing of at least a portion of the status and activity information regarding a location of and network activity pattern for the device for enabling services based on device location, and includes geo-fencing.

10. The computer-implemented method of claim 1 further comprising processing of received and stored information relating to network activity pattern of a device for enabling services based on monitoring or reporting on quality of service.

11. The computer-implemented method of claim 1 further comprising processing of at least a portion of the status and activity information relating to network activity pattern for the device enabling services for controlling a network based on perceived fraudulent usage or for sending warnings to subscribers of possible fraudulent usage based upon detection of unusual usage by the device.

* * * * *